US012085886B2

(12) United States Patent
Lee et al.

(10) Patent No.: US 12,085,886 B2
(45) Date of Patent: Sep. 10, 2024

(54) CONNECTION STRUCTURE FOR COUPLING WITH TONER CARTRIDGE

(71) Applicant: Hewlett-Packard Development Company, L.P., Spring, TX (US)

(72) Inventors: Changwoo Lee, Seongnam-si (KR); Jaeil Yu, Seongnam-si (KR); Junhui Kim, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 18/027,742

(22) PCT Filed: Mar. 23, 2021

(86) PCT No.: PCT/US2021/023575
§ 371 (c)(1),
(2) Date: Mar. 22, 2023

(87) PCT Pub. No.: WO2022/066215
PCT Pub. Date: Mar. 31, 2022

(65) Prior Publication Data

US 2023/0375973 A1 Nov. 23, 2023

(30) Foreign Application Priority Data

Sep. 25, 2020 (KR) ........................ 10-2020-0124728

(51) Int. Cl.
*G03G 21/16* (2006.01)
*G03G 15/08* (2006.01)
*G03G 21/18* (2006.01)

(52) U.S. Cl.
CPC ..... *G03G 21/1647* (2013.01); *G03G 15/0875* (2013.01); *G03G 21/1676* (2013.01); *G03G 21/186* (2013.01); *G03G 2215/068* (2013.01)

(58) Field of Classification Search
CPC ........... G03G 15/0865; G03G 15/0875; G03G 21/1647; G03G 21/1676; G03G 21/1853;
(Continued)

(56) References Cited

U.S. PATENT DOCUMENTS 10,539,924 B2 1/2020 Ueno et al.
10,678,184 B2 6/2020 Murakami et al.
(Continued)

FOREIGN PATENT DOCUMENTS

JP 11354209 A * 12/1999
JP 3157067 U 1/2010
(Continued)

OTHER PUBLICATIONS

JP 11-354209 A, Ide et al., with machine translation.*

*Primary Examiner* — Sophia S Chen
(74) *Attorney, Agent, or Firm* — Foley & Lardner LLP

(57) ABSTRACT

An example connection structure includes a connector and a connector support body. The connector is to engage with a coupler of a toner cartridge at a driving position when the toner cartridge is located at an operable position. The connector support body is rotatable about a rotation axis. The connector is also to support the connector to allow the connector to be inclined toward one side or another side with respect to the rotation axis while moving along the rotation axis with respect to the driving position.

18 Claims, 8 Drawing Sheets

A

(58) Field of Classification Search
CPC ........... G03G 21/186; G03G 2215/066; G03G 2215/068; G03G 2221/1657
See application file for complete search history.

(56) References Cited

U.S. PATENT DOCUMENTS

| | | | |
|---|---|---|---|
| 2009/0317132 | A1 | 12/2009 | Asanuma et al. |
| 2010/0170368 | A1 | 7/2010 | Hu |
| 2018/0046133 | A1 | 2/2018 | Kawakami et al. |

FOREIGN PATENT DOCUMENTS

| | | | |
|---|---|---|---|
| JP | 2011-095603 | A | 5/2011 |
| JP | 2011-095604 | A | 5/2011 |
| JP | 2015-099366 | A | 5/2015 |
| KR | 10-2014-0106623 | A | 9/2014 |

* cited by examiner

A

A

B - B'

CONNECTION STRUCTURE FOR COUPLING WITH TONER CARTRIDGE

CROSS-REFERENCE TO RELATED APPLICATIONS

This application is a U.S. National Stage Patent Application under 35 U.S.C. § 371 of PCT/US2021/023575, filed Mar. 23, 2021, which claims priority to Korean Patent Application No. 10-2020-0124728, filed Sep. 25, 2020, which are hereby incorporated by reference in their entireties.

BACKGROUND

In general, an image forming device refers to a device that may generate, print, receive, and transmit image data. For example, an image forming device may refer to a printer, a scanner, a copier, a fax machine, or a multi-function peripheral implemented by integrating a plurality of functions of such devices.

An image forming device may output data to a printing medium through a printing process using a toner cartridge. Such a toner cartridge may be selectively installed on a toner cartridge support and may be replaced with a new toner cartridge after being used for a predetermined period.

DETAILED DESCRIPTION

As used herein, the term "first axis a" refers to a virtual axis extending along a direction in which an elastic member support portion (e.g., elastic member support portion 312) of a connector support body (e.g., connector support body 300) extends. In addition, the term "second axis r" refers to a virtual axis extending along a direction in which a guide follower (e.g., guide follower 230) extends.

Hereinafter, examples of an image forming device will be described with reference to the drawings.

In the following examples, the term "image forming device" refers to a device that may generate, print, receive, and transmit image data. For example, the image forming device may be a printer, a scanner, a copier, a fax machine, and a multi-function peripheral printer (MFP) that complexly implements the functions of the printer, the scanner, the copier, and the fax machine through one device. For convenience, in the subject specification, the image forming device will be described as a printer. However, this is not to be considered limiting in that the image forming device may also be implemented as any of the scanner, the copier, the fax machine, and the MFP.

Figure 1:
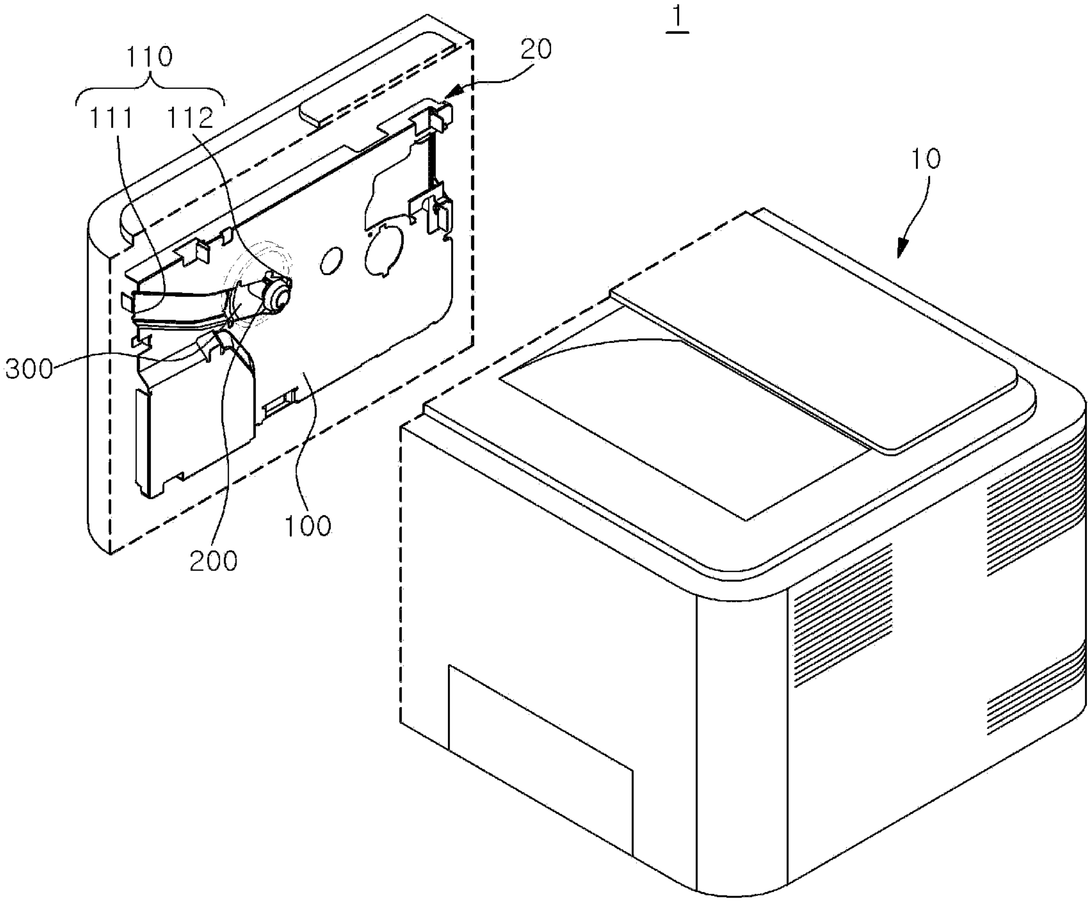
FIG. 1 is a perspective view of an image forming device according to an example.
Figure 2:
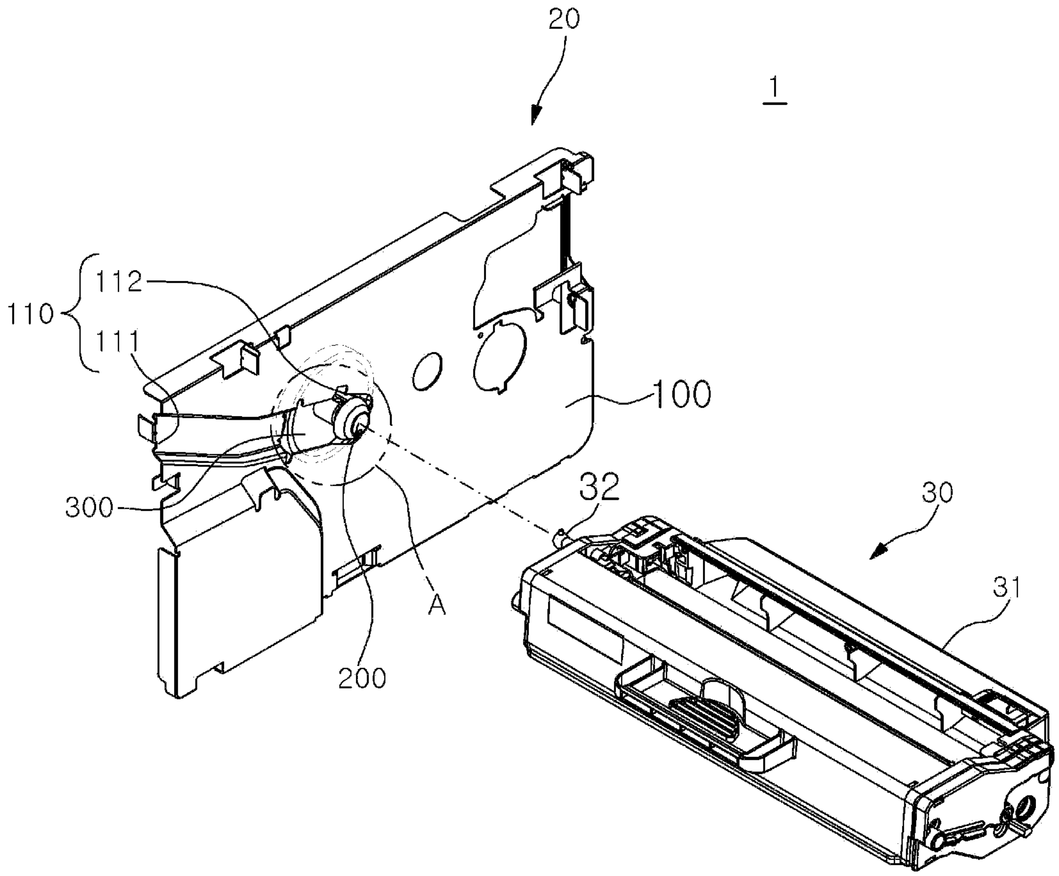
FIG. 2 is a partially exploded perspective view of the image forming device shown in FIG. 1 according to an example.

FIG. 1 is a perspective view of an image forming device according to an example. FIG. 2 is a partially exploded perspective view of the image forming device shown in FIG. 1 according to an example.

Referring to FIGS. 1 and 2, an image forming device 1 may print data generated at a terminal device such as a computer or the like on a printing medium such as paper or the like. Further, the image forming device 1 may include a main body 10, a toner cartridge support 20, and a toner cartridge 30.

The main body 10 may include a space for accommodating the toner cartridge support 20 and the toner cartridge 30. In addition, the main body 10 may include a space in which hard copying is performed. As used herein, the term "hard copying" may refer to an operation of outputting an image to a printing medium such as paper or the like. The main body 10 may be provided with a door that is capable of opening and closing the internal space of the main body 10 to the outside. The toner cartridge 30 may be brought into or taken out of the main body 10 through the door.

The toner cartridge support 20 may include a connection structure for connecting to the toner cartridge 30. The toner cartridge support 20 is to be separable from the toner cartridge 30. For example, when there is a need to replace the toner cartridge 30, the toner cartridge support 20 and the toner cartridge 30 may be separated. In addition, the toner cartridge support 20 may be connected to the toner cartridge 30, and may transmit power of a driving part (not shown) to the toner cartridge 30. The toner cartridge support 20 may include a frame 100, a connector 200, and a connector support body 300.

The frame 100 may support the toner cartridge 30. Further, the frame 100 may support the connector 200 and the connector support body 300, and may be supported by the main body 10. In an example, the frame 100 may guide a movement of the toner cartridge 30 when the toner cartridge 30 moves so as to be connected to the toner cartridge support 20. In addition, the frame 100 may support the toner cartridge 30 at a left side or a right side of the toner cartridge 30. A frame rail 110 may be coupled to the frame 100.

The frame rail 110 may guide a movement of the toner cartridge 30. For example, when the toner cartridge 30 moves so as to be connected to the toner cartridge support 20, the frame rail 110 may guide the movement of the toner cartridge 30 so that the toner cartridge 30 moves along the frame rail 110. Further, the frame rail 110 may include a plurality of protrusions protruding from the frame 100 or a groove concavely located on the frame 100. The frame rail 110 may include a rail inlet 111 and a coupling portion 112.

The rail inlet 111 may include a portion through which the toner cartridge 30 may enter and exit the frame rail 110. The rail inlet 111 may be provided at a door side of the main body 10 in the frame rail 110.

The coupling portion 112 may include a portion on which the connector 200, that is to be engaged with a coupler 32, is placed. The coupling portion 112 may be located at an opposite side of the frame rail 110 from the rail inlet 111.

The connector 200 may be connected to the coupler 32, to be described later, and may transmit power to the coupler 32. The connector 200 may be engaged with the coupler 32 at a driving position when the toner cartridge 30 is placed at an operable position. As used herein, the term "driving position" may refer to not only the position of the connector 200 but also the orientation and posture of the connector 200.

As used herein, the term "driving position" refers to the position of the connector 200 where the connector 200 engages with the coupler 32 when the toner cartridge 30 is placed at the operable position. An example of the driving position will be described with reference to FIG. 3.

Figure 3:
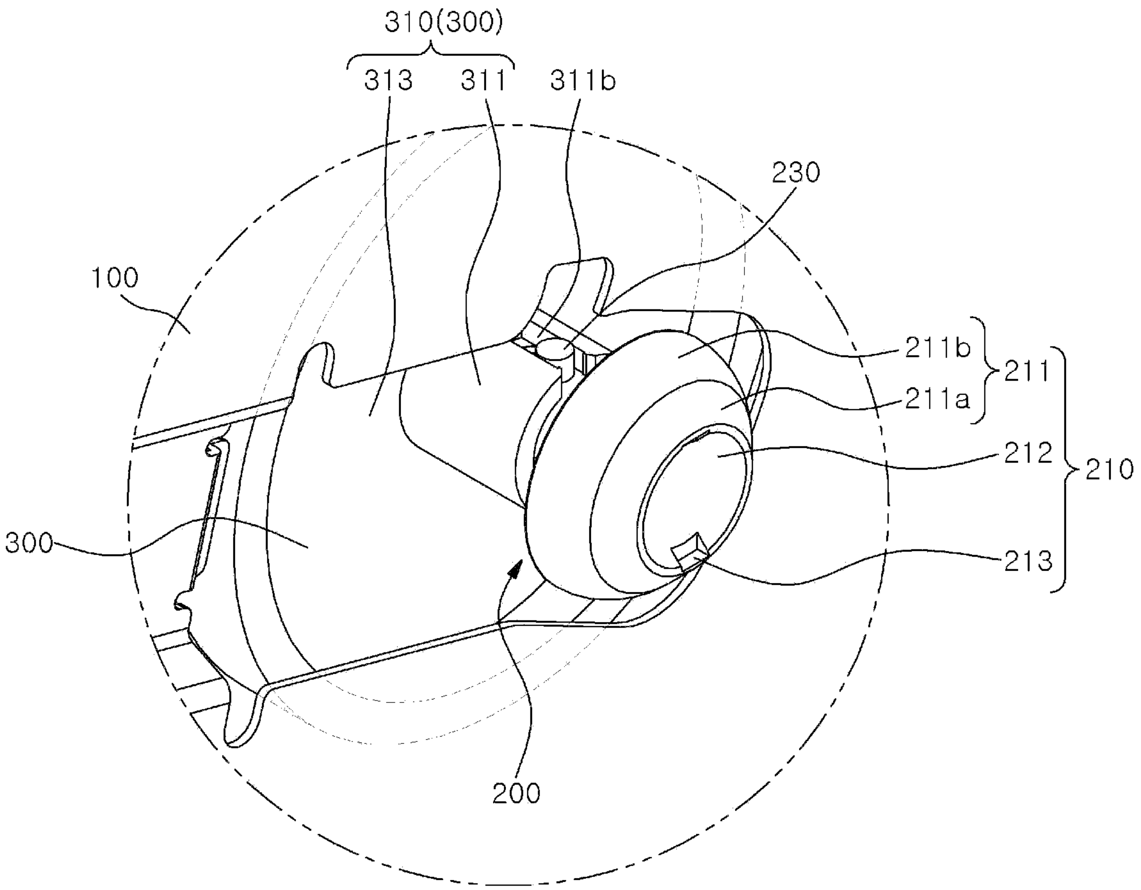
FIG. 3 is an enlarged view of part A in FIG. 2 according to an example.

FIG. 3 is an enlarged view of part A in FIG. 2 according to an example.

Referring to FIG. 3, the driving position refers to the position of the connector 200 where the connector 200 is connected to the coupler 32 in order to transmit power to the coupler 32 and where the connector 200 is placed on a straight line with the coupler 32. As an example, the connector 200 placed at the driving position may be coaxial with the coupler 32 and the connector support body 300.

Figure 4:
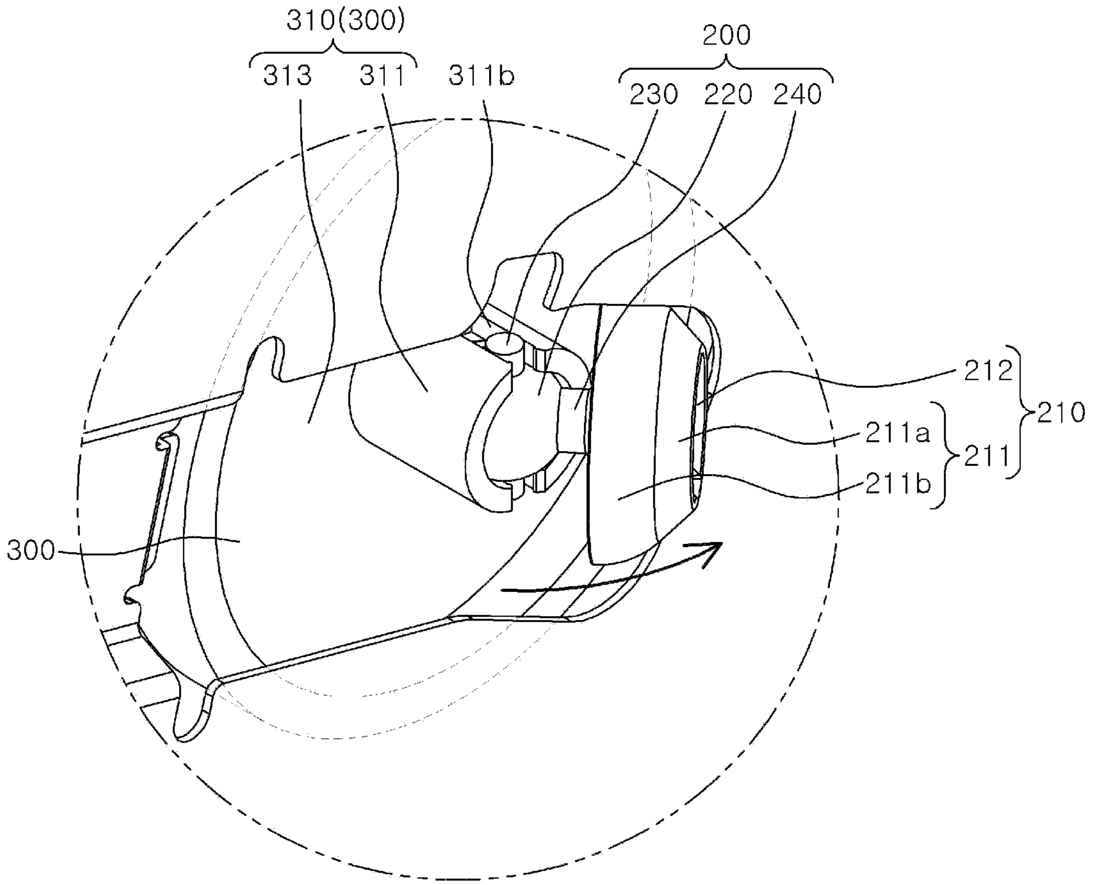
FIG. 4 is an enlarged view of part A when the connector shown in FIG. 2 is moved to one side according to an example.
Figure 5:
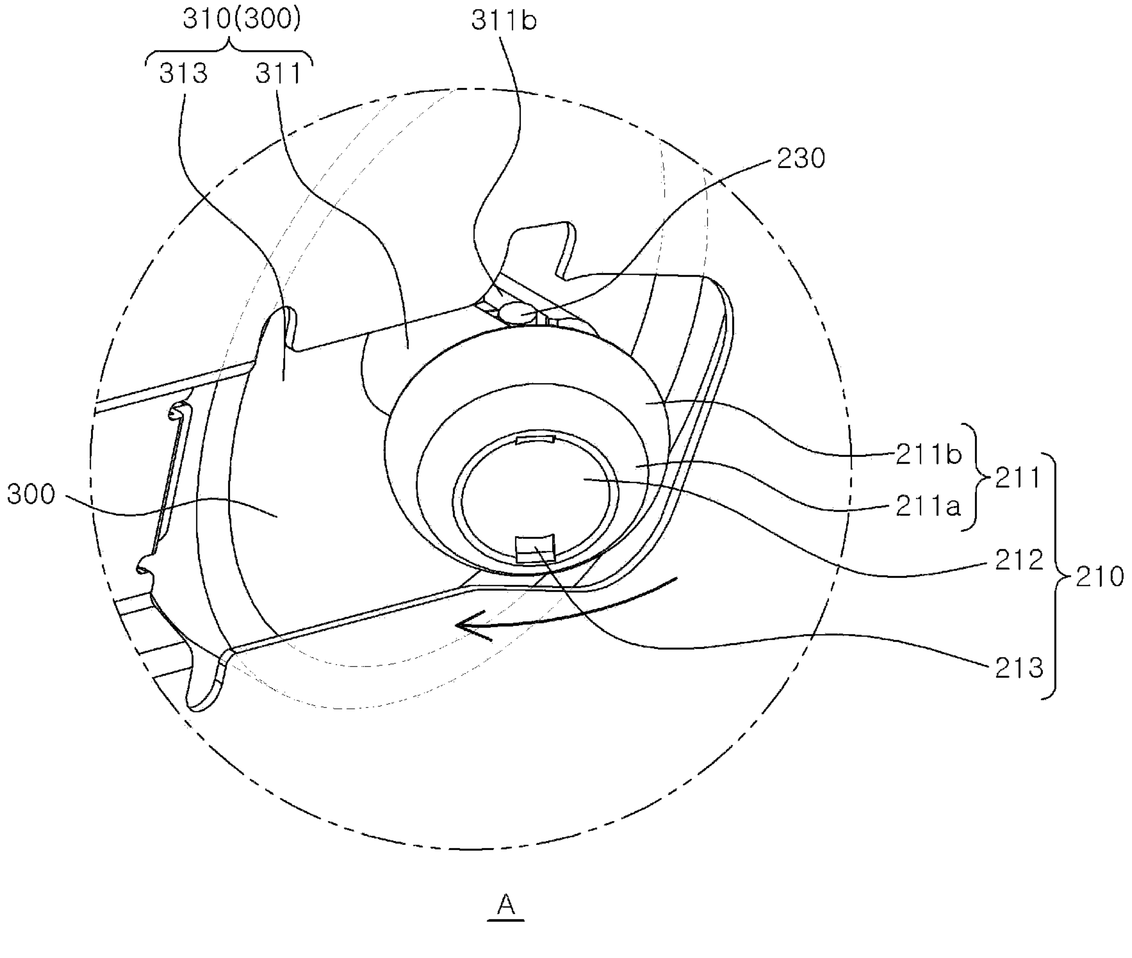
FIG. 5 is an enlarged view of part A when the connector shown in FIG. 2 is moved to another side according to an example.

FIG. 4 is an enlarged view of part A when the connector shown in FIG. 2 is moved to one side according to an example. FIG. 5 is an enlarged view of part A when the connector shown in FIG. 2 is moved to another side according to an example.

Referring to FIGS. 4 and 5, the connector 200 may be inclined to one side or another side (e.g., an opposite side) about the second axis r with respect to the connector support body 300. In addition, the connector 200 may be inserted into the connector support body 300 along the first axis a. The connector 200 may be removed from the driving position by the coupler 32. In this case, the connector 200 may rotate to one side when the coupler 32 moves while making contact with a guide surface 211 to be described later, and may rotate to the other side when the coupler 32 moves while making contact with a seating surface 212 to be described later.

In addition, an elastic member (e.g., elastic member 320 to be described later) may apply a restoring force to the connector 200 removed from the driving position. For example, a restoring force may act on the connector 200 inclined toward one side about the second axis r by the coupler 32 so that the connector 200 rotates toward the other side, and a restoring force acts outward of the connector support body 300 along the first axis a. By the restoring force of such an elastic member, the connector 200 may be placed at the driving position again even if it is removed from the driving position.

Figure 6:
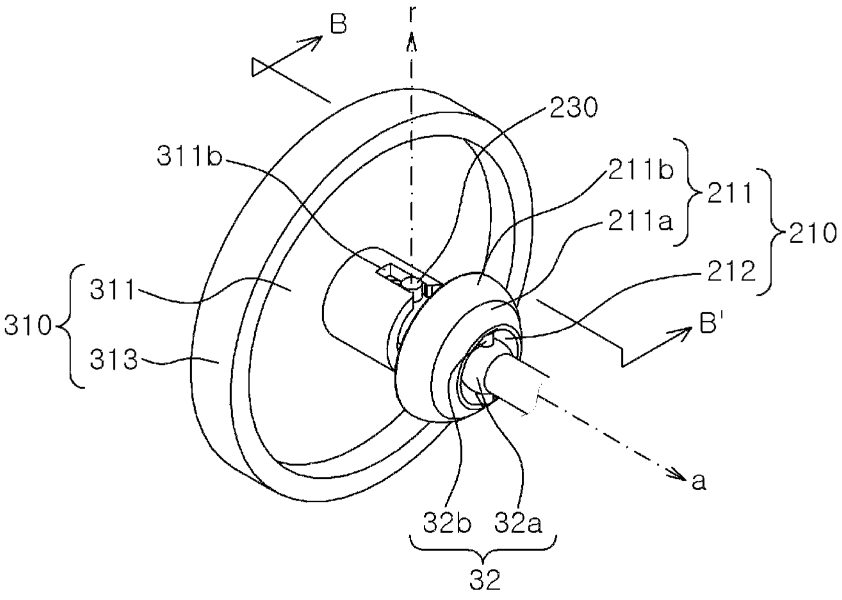
FIG. 6 is a perspective view showing a state in which the connector, the connector support body, and the coupler shown in FIG. 2 are connected according to an example.
Figure 7:
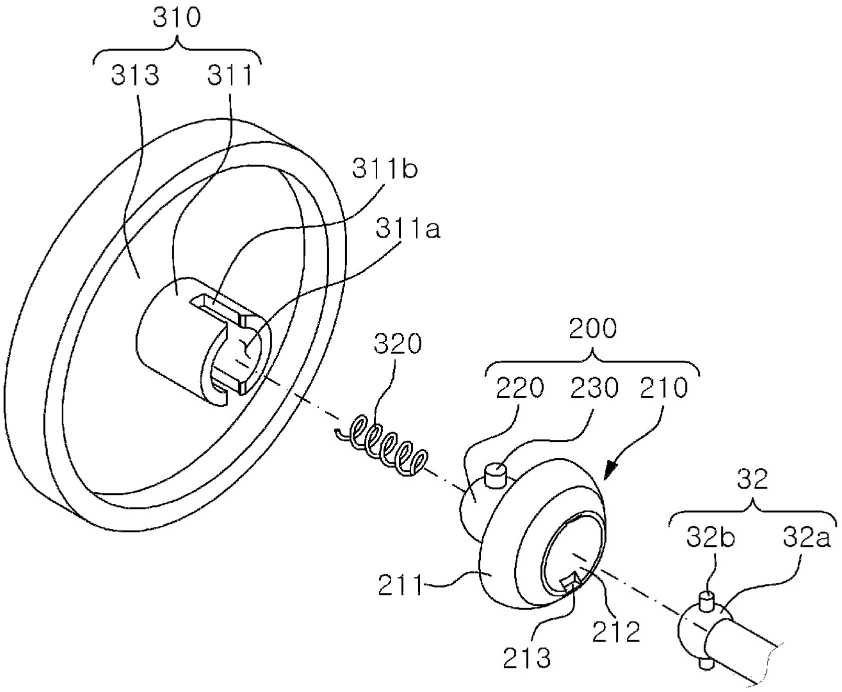
FIG. 7 is an exploded perspective view of the connector, the connector support body, and the coupler shown in FIG. 2 according to an example.
Figure 8:
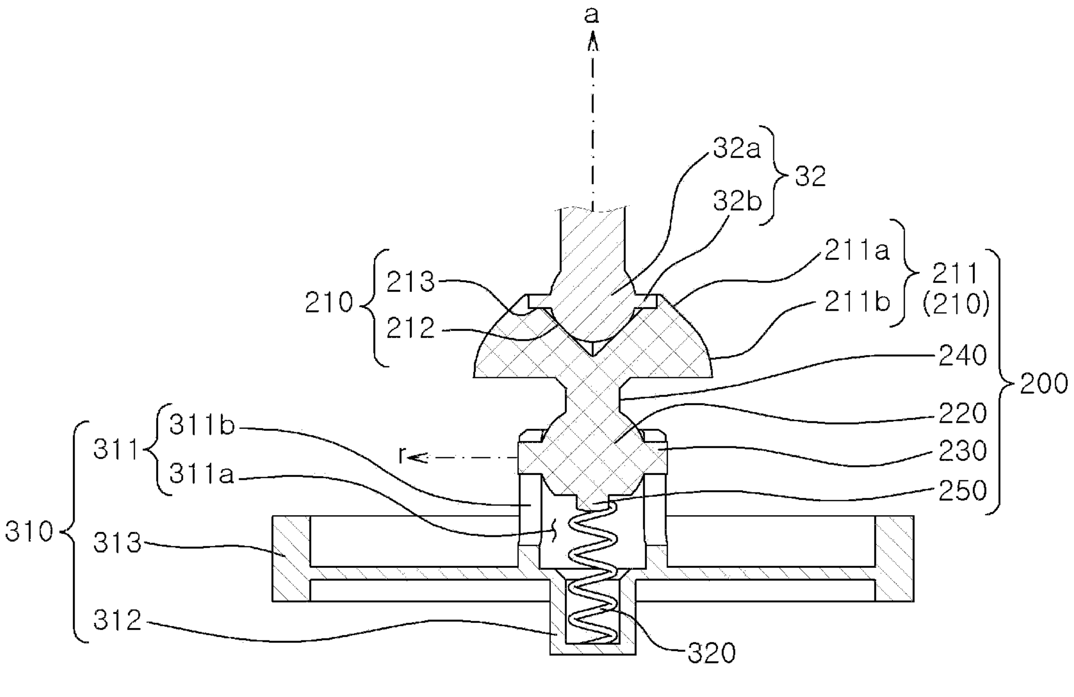
FIG. 8 is a sectional view taken along line B-B' in FIG. 6 according to an example.

FIG. 6 is a perspective view showing a state in which the connector, the connector support body, and the coupler shown in FIG. 2 are connected according to an example. FIG. 7 is an exploded perspective view of the connector, the connector support body, and the coupler shown in FIG. 2 according to an example. FIG. 8 is a sectional view taken along line B-B' in FIG. 6 according to an example.

Referring to FIGS. 6 to 8, the connector 200 may include a connector head 210, a rotation portion 220, a guide follower 230, a neck portion 240, and a buckling prevention portion 250.

The connector head 210 may make contact with the coupler 32 and may engage with the coupler 32 when the connector 200 is placed at the driving position. The connector head 210 may include the guide surface 211 and the seating surface 212.

The guide surface 211 may extend to form a predetermined angle with respect to the first axis a and may include a first inclined portion 211*a* and a second inclined portion 211*b* having inclinations different from each other.

The first inclined portion 211*a* may extend to form a predetermined angle with respect to the first axis a and may extend to form a larger angle with respect to the first axis a than the second inclined portion 211*b*. In addition, the first inclined portion 211*a* may extend in a direction that deviates from the moving direction of the coupler 32.

The first inclined portion 211*a* may include a portion to make contact with the coupler 32. For example, when the toner cartridge 30 is installed on the toner cartridge support 20 or separated from the toner cartridge support 20, the coupler 32 may move while remaining in contact with one point of the first inclined portion 211*a*. In other words, the coupler 32 may move along the first inclined portion 211*a*. In this case, the first inclined portion 211*a* may be pressed by the coupler 32 in the direction of the first axis a and in the direction of movement of the coupler 32. The coupler 32 may be moved in the direction of the first shaft a, or may be inclined in the direction of movement of the coupler 32.

In this way, the first inclined portion 211*a* may extend in a direction that deviates from the direction of movement of the coupler 32, whereby there is an effect that the connector 200 is pressed in the direction of the first axis a and in the direction of movement of the coupler 32 by merely moving the coupler 32 in one direction.

The second inclined portion 211*b* may extend to form a smaller angle with respect to the first axis a than the first inclined portion 211*a*.

The seating surface 212 may align the relative position of the coupler 32 with respect to the connector 200 such that the connector 200 placed at the driving position and the coupler 32 form a predetermined arrangement. For example, when the connector 200 removed from the driving position is placed at the driving position again by the coupler 32, the coupler 32 may move inward of the seating surface 212 while making contact with the seating surface 212. In this case, the seating surface 212 may align the position of the coupler 32 so that the coupler 32 is coaxial with the connector 200. The seating surface 212 may be concavely located on the connector head 210. For example, the seating surface 212 may have a conical shape. In addition, the seating surface 212 may have an inclination so that the seating surface 212 may extend so as to be inclined with respect to the first axis a.

In this way, when the connector 200 is placed at the driving position, the seating surface 212 aligns the position of the coupler 32 so that the coupler 32 and the connector 200 may be coaxial. Consequently, there is an effect that when the connector 200 is placed at the driving position again after being removed from the driving position, the connector 200 and the coupler 32 are placed at predetermined positions.

In an example, a fixing recess 213 may be located on the connector head 210.

The fixing recess 213 may prevent the coupler 32 from being removed from the connector 200 and may be engaged with a locking portion 32*b* to be described later. In addition, the connector 200 may rotate about the first axis a while the fixing recess 213 and the locking portion 32*b* are engaged with each other. For example, the fixing recess 213 may be concavely located on the seating surface 212 and may have a predetermined step so that the locking portion 32*b* can be engaged with the fixing recess 213.

The rotation portion 220 may be supported by a connector guide 310, which will be described below, so as to be rotatable toward one side or the other side about the second axis r. The rotation portion 220 may be inserted into an insertion hole 311*a* to be described below and may move along the first axis a inside the insertion hole 311*a* while being supported by the connector guide 310. For example, when the connector 200 is removed from the driving position, the rotation portion 220 may rotate toward one side or the other side about the second axis r. In this case, the rotation portion 220 may move inward of the insertion hole 311*a*. A portion of the rotation portion 220 may have, for example, a dome shape. In addition, the portion of the rotation portion 220 connected to the buckling prevention portion 250 may have a flat shape.

The guide follower 230 may engage with an engaging slot 311*b* to be described later, and may move along the engaging slot 311*b*. For example, the guide follower 230 may move along the engaging slot 311*b* in the direction of the first axis a. By such movement of the guide follower 230, the rotation portion 220 may move inside the insertion hole 311*a*. In addition, the guide follower 230 may transmit the power of the connector support body 300 to the rotation portion 220. For example, the guide follower 230 may rotate while being engaged with the engaging slot 311*b* so that the connector 200 rotates together with the connector support body 300.

In an example, the guide follower 230 may protrude from the rotation portion 220. For example, the guide follower 230 may rotate about the second axis r while being supported by the engaging slot 311*b*. In this case, the connector 200 may be inclined toward one side or the other side of the second axis r by the rotation of the guide follower 230. The guide follower 230 may be provided in a plural number, and the plurality of guide followers 230 may protrude from the rotation portion 220 in opposite directions to each other.

The neck portion 240 may connect the connector head 210 and the rotation portion 220. The connector head 210 may be connected to one side of the neck portion 240, and the rotation portion 220 may be connected to the other side of the neck portion 240. In addition, the neck portion 240 may extend in the direction of the first axis a.

The buckling prevention portion 250 may prevent the elastic member 320 from being removed from the connector 200. For example, the buckling prevention portion 250 may protrude from the rotation portion 220 along the first axis a, and may be surrounded by an end of the elastic member 320. By inserting the buckling prevention portion 250 into the inside of the elastic member 320 in this way, the portion of the elastic member 320 surrounding the buckling prevention portion 250 can be prevented from being bent, and the elastic member 320 can be prevented from being removed from the connector 200.

The connector support body 300 may be rotatable with respect to a predetermined rotation axis extending along the first axis a. The predetermined rotation axis may refer to a virtual axis extending along the first axis a. The connector support body 300 may support the connector 200 to allow the connector 200 to be inclined toward one side or the other side about the second axis r. In addition, the connector support body 300 may transmit power transmitted from a driving part (not shown) to the connector 200. As an example, the driving part for rotating the connector support body 300 may be a motor, an actuator, or the like. One side of the connector support body 300 may be connected to the driving part, and the other side thereof may be engaged with the connector 200. Further, the connector support body 300 may be disposed coaxially with the connector 200 when the connector 200 is placed at the driving position. The connector support body 300 may include the connector guide 310 and the elastic member 320. In an example, the connector support body 300 may be referred to as a connector holder 300.

The connector guide 310 may receive the power from the driving part and transmit the power to the connector 200. In addition, the connector guide 310 may guide the movement of the connector 200 so that the connector 200 moves along the first axis a. The connector guide 310 may rotatably support the connector 200, and may guide the rotation of the connector 200 so that the connector 200 rotates toward one side or the other side about the second axis r. The connector guide 310 may include a guide portion 311, an elastic member support portion 312, and a wheel portion 313.

The guide portion 311 may guide the movement of the connector 200 and may support the connector 200. In addition, a portion of the connector 200 may be inserted into the guide portion 311. The insertion hole 311*a* and the engaging slot 311*b* may be located in the guide portion 311.

The insertion hole 311*a* may accommodate a portion of the rotation portion 220 so that the rotation portion 220 may be inserted into the insertion hole 311*a*. The insertion hole 311*a* may be recessed from the center of the guide portion 311 along the first axis a. For example, when the connector 200 is removed from the driving position by the coupler 32, the rotation portion 220 may be inserted into the insertion hole 311*a*. In addition, when the connector 200 is placed at the driving position again by the coupler 32, the rotation portion 220 may move to the outside of the insertion hole 311*a*. In this way, the insertion hole 311*a* may guide the movement of the rotation portion 220 in the direction of the first axis a.

The engaging slot 311*b* may be engaged with the guide follower 230 and may guide the movement of the guide follower 230. For example, the engaging slot 311*b* may have a groove shape located on the sidewall of the guide portion 311, and may extend in the direction of the first axis a. Accordingly, the guide follower 230 may be moved in the direction of the first axis a while being engaged with the engaging slot 311*b*. In an example, a stopper for preventing the guide follower 230 from being removed may be located at one side of the engaging slot 311*b* opened to the outside. The stopper may protrude to the inside of the engaging slot 311*b*. In addition, there may be more than one engaging slot 311*b* and the plurality of engaging slots 311*b* may be engaged with a plurality of guide followers 230.

The elastic member support portion 312 may support the elastic member 320. For example, the elastic member support portion 312 may have a hole located at the center thereof, and the elastic member 320 may be seated in the hole. In addition, one side of the elastic member 320 may be fixedly supported on the elastic member support portion 312. In an example, the elastic member support portion 312 may receive power from the driving part, and may rotate about the first axis a. In addition, one end of the elastic member support portion 312 may be connected to the driving part, and the other end thereof may be connected to the wheel portion 313.

The wheel portion 313 may connect the guide portion 311 and the elastic member support portion 312. For example, the wheel portion 313 may have a shape of a disk or a wheel.

The elastic member 320 may provide a restoring force to the connector 200 to move the connector 200 to the driving position when the connector 200 is removed from the driving position. For example, when the connector 200 is removed from the driving position, the elastic member 320 may provide a restoring force to the connector 200 toward one side of the first axis a, i.e., outward of the connector guide 310. In addition, when the connector 200 is inclined toward one side about the second axis r, the elastic member 320 may apply a restoring force to the connector 200 so that the connector 200 rotates toward the other side about the second axis r. One end of the elastic member 320 may be coupled to the buckling prevention portion 250 and may be provided to surround the buckling prevention portion 250. Further, the other end of the elastic member 320 may be coupled to the elastic member support portion 312.

Thus, there is provided an effect that, even if the connector 200 is removed from the driving position by the coupler 32, it can be returned to the driving position again by the restoring force of the elastic member 320.

In an example, the connector support body 300 may further include a driving gear (not shown) for adjusting the rotation speed of the connector guide 310. The driving gear may be a speed reduction gear connected to the connector guide 310 to reduce the rotation speed of the connector guide 310. In addition, the connector support body 300 may further include a stud as another example. The stud may include a pole inserted into the connector guide 310 and a flange that supports the pole. In addition, the flange may be connected to the driving part either directly or through pulleys or the like to transmit rotational power to the pole and connector guide 310.

Referring again to FIG. 2, the toner cartridge 30 may be a cartridge to accommodate toner therein that may be used to produce an image. The toner cartridge 30 may be selectively installed on the toner cartridge support 20. For example, the toner cartridge 30 may be replaced with a new toner cartridge 30 after being used for a predetermined period of time, and may be installed on the toner cartridge support 20. The toner cartridge 30 may include a cartridge body 31 and the coupler 32.

The cartridge body 31 may accommodate toner therein. In addition, the cartridge body 31 may be selectively installed on the toner cartridge support 20, and may support the coupler 32.

The coupler 32 may make contact with the connector 200 and may be engaged with the connector 200 by moving together with the cartridge body 31. For example, when the coupler 32 moves to engage with the connector 200, the coupler 32 may remove the connector 200 from the driving position. In this case, the coupler 32 may press the connector 200 in the direction of the first axis a, and the connector 200 may be inserted into the connector guide 310 along the first axis a. In addition, the connector 200 may rotate to one side about the second axis r. The coupler 32 may include a coupler head 32*a* and the locking portion 32*b*.

The coupler head 32*a* may make contact with the connector head 210 when the toner cartridge 30 is installed. For example, when the toner cartridge 30 is installed, the coupler head 32*a* may press the coupler 32 while remaining in contact with the guide surface 211 and may move while remaining in contact with one point of the guide surface 211. While the coupler head 32*a* is in contact with the guide surface 211, the connector 200 may rotate toward one side about the second axis r. In addition, as the toner cartridge 30 continues to move, the coupler head 32*a* may move over the guide surface 211 to make contact with the seating surface 212 and may move while remaining in contact with one point of the seating surface 212. While the coupler head 32*a* is in contact with the seating surface 212, the connector 200 may rotate toward the other side about the second axis r. Thereafter, the coupler head 32*a* may be moved to a predetermined position by the seating surface 212, and the coupler 32 and the connector 200 may be placed to form a predetermined arrangement. As an example, the coupler 32 may be coaxial with the connector 200 placed at the driving position.

The locking portion 32*b* may prevent the coupler 32 from being removed from the connector 200. For example, when the coupler 32 and the connector 200 are engaged with each other, the locking portion 32*b* may engage with the fixing recess 213. In addition, the coupler 32 may rotate about the first axis a while the locking portion 32*b* and the fixing recess 213 are engaged with each other. Thus, the coupler 32 may rotate in response to the rotation of the connector 200. The locking portion 32*b* may protrude from the coupler head 32*a*.

As described above, in the image forming device 1 according to an example, the coupler 32 may not be provided so as to be inclined with respect to the cartridge body 31. Rather, the connector 200 may be inclined with respect to the frame 100. In addition, the coupler 32 may not have flexibility, but the connector 200 has flexibility. Accordingly, there is provided an effect that the structure of the toner cartridge 30 is simplified while efficiently transmitting the power of the toner cartridge support 20 to the toner cartridge 30. In addition, there is provided an effect that, by simplifying the structure of the toner cartridge 30, it is possible to simplify the manufacturing process and to reduce the manufacturing cost.

In addition, there is provided an effect that, even if the connector 200 is pressed by the coupler 32, the elastic member 330 may provide a restoring force to the connector 200, thereby returning the connector 200 to the driving position. In addition, the connector 200 and the coupler 32 may form a predetermined arrangement due to the seating surface 212. Owing to such arrangement, there is provided an effect that, even if the connection and separation between the connector 200 and the coupler 32 are repeated, the connector 200 and the coupler 32 may be engaged in the same arrangement.

While examples of the present disclosure have been described herein, the present disclosure is not limited thereto. Descriptions of features or aspects within each example should typically be considered as available for other similar features or aspects in other examples. In addition, it is apparent that those skilled in the art can change or modify the disclosed examples based on the present specification, and thus, such changes or modifications fall within the scope of the present disclosure as defined by the following claims.

What is claimed is:

1. A connection structure comprising:

a connector to engage with a coupler at a driving position; and a connector support body, rotatable about a rotation axis, to support the connector to allow the connector to be inclined toward one side or another side with respect to the rotation axis about a first axis, and to prevent the connector from being inclined about a second axis, wherein the first axis and the second axis are perpendicular to the rotation axis, while moving along the rotation axis with respect to the driving position.

2. The connection structure of claim 1, wherein the connector support body includes a connector guide to guide a movement of the connector along the rotation axis, wherein the connector includes a rotation portion movably accommodated in the connector guide, and wherein the connector is to be rotatable toward the one side or the other side about the rotation portion.

3. The connection structure of claim 2, comprising:

a plurality of guide followers protruding from the rotation portion, wherein the connector guide has a plurality of engaging slots having a groove shape and extending in a direction of the rotation axis to respectively engage the plurality of guide followers, and wherein the plurality of guide followers are movable in the direction of the rotation axis along the plurality of engaging slots while being engaged with the plurality of engaging slots.

4. The connection structure of claim 2, wherein the connector support body includes an elastic member to, when the connector is removed from the driving position, provide a restoring force to the connector to move the connector to the driving position.

5. The connection structure of claim 4, wherein the connector guide includes an elastic member support portion to receive the elastic member, and wherein the connector includes a buckling prevention portion protruding from the rotation portion in an extension direction of the rotation axis to couple to the elastic member.

6. The connection structure of claim 1, wherein the connector includes a connector head to contact the coupler, wherein the connector head includes a seating surface having a recessed shape, and wherein the seating surface has an inclination to align a position of the coupler with respect to the connector.

7. The connection structure of claim 6, wherein, when the connector and the coupler are engaged, the connector and the connector support body are coaxial with each other.

8. An image forming device, comprising:

a toner cartridge support to support a toner cartridge having a coupler, wherein the toner cartridge support includes:

a connector to engage with the coupler at a driving position; and a connector support body, rotatable about a rotation axis, to support the connector to allow the connector to be inclined toward one side or another side with respect to the rotation axis about a first axis, and to prevent the connector from being inclined about a second axis, wherein the first axis and the second axis are perpendicular to the rotation axis, while moving along the rotation axis with respect to the driving position.

9. The image forming device of claim 8, wherein the connector support body includes a connector guide to guide a movement of the connector along the rotation axis, wherein the connector includes a rotation portion movably accommodated in the connector guide, and wherein the connector is to be rotatable toward the one side or the other side about the rotation portion.

10. The image forming device of claim 8, wherein the connector includes a connector head to contact with the coupler, wherein the connector head includes a seating surface having a recessed shape, and wherein the seating surface has an inclination to align a position of the coupler with respect to the connector.

11. The image forming device of claim 10, wherein the connector head includes a guide surface to contact the coupler, wherein the seating surface extends in a direction deviated from the rotation axis, and wherein the connector is to rotate toward the one side when the coupler moves while remaining in contact with the guide surface and to rotate toward the other side when the coupler moves while remaining in contact with the seating surface.

12. The image forming device of claim 11, wherein the guide surface includes a first inclined portion extending to form a first angle with respect to the rotation axis, and a second inclined portion extending so as to form a second angle, smaller than the first angle, with respect to the rotation axis, and wherein the coupler is to contact the first inclined portion when the coupler moves while remaining in contact with the guide surface.

13. The image forming device of claim 10, wherein the connector head includes a fixing recess located on the seating surface, wherein the coupler includes a coupler head and a locking portion protruding from the coupler head, and wherein the connector head is to rotate about the rotation axis while the fixing recess and the locking portion are engaged with each other.

14. A cartridge detachably mountable to an image forming apparatus having a connector, the cartridge comprising:

a coupler to engage with the connector at a driving position when the cartridge is located at an operable position;

wherein the connector is to be supported by a connector support body rotatable about a rotation axis and is to be inclined toward one side or another side with respect to the rotation axis about a first axis, and to prevent the connector from being inclined about a second axis, wherein the first axis and the second axis are perpendicular to the rotation axis.

15. The cartridge of claim 14, wherein the coupler is to contact a connector head of the connector, the connector head including a seating surface with a recessed shape to align a position of the coupler with respect to the connector.

16. The cartridge of claim 14, wherein the coupler is to contact a guide surface of the connector head, and the connector is to rotate toward the one side when the coupler remains in contact with the guide surface.

17. The cartridge of claim 14, wherein the coupler is coaxial with the connector and the connector support body at the driving position.

18. The cartridge of claim 17, wherein when moving to engage with the connector, the coupler is to insert the connector into a connector guide.

* * * * *